United States Patent [19]

Müller et al.

[11] 4,132,642
[45] Jan. 2, 1979

[54] PROCESS FOR FILTERING A CELLULOSE ACETATE SOLUTION

[75] Inventors: Hans Müller, Erlenbach; Rudolf Bühler, Wolfhausen; Nikolas Rapsomanikis, Mannedorf, all of Switzerland

[73] Assignee: Chemap AG, Mannedorf, Switzerland

[21] Appl. No.: 830,444

[22] Filed: Sep. 6, 1977

[30] Foreign Application Priority Data

Sep. 7, 1976 [CH] Switzerland ............... 11354/76

[51] Int. Cl.² ........................................... B01D 37/02
[52] U.S. Cl. .................................................. 210/75
[58] Field of Search ........................ 210/75, 79, 331

[56] References Cited

U.S. PATENT DOCUMENTS

| | | | |
|---|---|---|---|
| 2,205,331 | 6/1940 | Alton | 210/203 |
| 2,214,943 | 9/1940 | Tinsley | 210/75 |
| 3,178,021 | 4/1965 | Bray | 210/75 |
| 3,251,469 | 5/1966 | Müller | 210/331 |

Primary Examiner—William A. Cuchlinski, Jr.
Assistant Examiner—Jon E. Hokanson
Attorney, Agent, or Firm—Michael J. Striker

[57] ABSTRACT

A process for filtering a cellulose acetate solution comprises the steps of providing a solution of cellulose acetate which is dissolved in an organic solvent; adding to the solution a quantity of loose particulate matter and loose fibers so as to form a mixture; and filtering the solution through pores of a filter medium so as to produce a filtrate of the solution, whereby due to addition of the loose particulate matter and the loose fibers clogging of the pores is reduced relative to the amount of filtrate passing through the pores and the effective filtering time of the filtering medium is thereby increased.

9 Claims, 1 Drawing Figure

PROCESS FOR FILTERING A CELLULOSE ACETATE SOLUTION

BACKGROUND OF THE INVENTION

The invention relates to a process for filtering cellulose acetate solutions.

Cellulose acetate in organic solvents is used to produce acetate rayon, foils and binders. The purification of the acetate solution takes place by means of filtration; advantageously a settling filter is used.

The use of such a filter is disclosed in Swiss Pat. No. 446274. Pulverized and very fine grained inorganic matter having a particle size within the range of 50–150 microns are used as filter aids in a filter of this type, according to the disclosure of Swiss Pat. No. 477 215.

In the case of spinnable acetic acid esters of cellulose (from which the so-called cellulose acetate precipitates), there is problem of purifying the filtrate in such a manner as to avoid clogging the spinning nozzles. Up to now, all of the conventional processes have operated only partially satisfactorily, since the expensive spinning nozzles must be replaced too frequently. One of the most important values for determining the characteristics of the filtration behavior of viscous solutions (such as acetylated cellulose) is the filter clogging value, known as the "FZ value" (Verein der Zellstoff- und Papier-Chemiker und -Ingenieure, Merkblatt (pamphlet) III/6, B/68 of Oct. 1, 1968).

The formula for determining the FZ value is:

$$FZ = \frac{2\left(\frac{t_2}{m_2} - \frac{t_1}{m_1}\right) \times 10}{t_2 - t_1} \ [g^{-1}]$$

where $t_1$ and $t_2$ are two different filtering times in minutes, both being calculated from the beginning of the engagement of the filter and the solution to be filtered; and $m_1$ and $m_2$ are the quantities of filtrate in grams passing through the filter respectively over the times $t_1$ and $t_2$. It is assumed that the time $t_1$ is chosen to be sufficiently long after commencement of filtering so that significant filtration can occur.

Tests with quartz sand have led at best to FZ values between 70 and 100 per gram. However, as a rule these FZ values are higher, and the higher the FZ value the more rapidly the pores of a filter used filtering of viscous solutions will become clogged.

SUMMARY OF THE INVENTION

An object of the present invention is to provide an improved process for the filtration of viscous materials.

Another object of the invention is to provide a process for filtering an acetylated solution of cellulose in an organic solvent in such a way as to reduce clogging of the pores of the filter relative to the amount of filtrate passing through the pores, to thereby increase the effective filtering time of the filtering medium.

In accordance with the invention, a filtering aid of loose fibers is added to a solution of cellulose acetate in an organic solvent which is to be filtered.

Various ones of the well-known particulate filter aids and various kinds of loose fibers may be used. Quartz sand has been found to be particularly satisfactory as the particulate filter aid, and cellulose fibers (such as cotton linters) have been found to be suitable as the loose fibers.

With above and other objects in view, the present invention may utilize a filter apparatus which includes an elongated filter housing of substantially clyindrical configuration having a lower portion of reduced cross section. A filter which may be used in accordance with the invention is disclosed by U.S. Pat. No. 3,251,469, the contents of which are herein incorporated by reference. An elongated hollow shaft is substantially coaxial with the housing, extends along the interior thereof and is turnably supported by the housing, and a plurality of filter elements are carried by the shaft for rotation therewith and communicate with the interior of the shaft. A drive means is connected to the shaft for rotating the latter, so that after a liquid having solid particles therein passes through the filter elements on the hollow shaft the particles retained by the filter elements may be thrown from the latter by centrifugal force during rotation of the shaft.

BRIEF DESCRIPTION OF THE DRAWING

The novel features which are considered as characteristic for the invention are set forth in particular in the appended claims. The invention itself, however, together with additional objects and advantages thereof, will be best understood from the following description of specific embodiments when read in connection with the accompanying drawings, in which:

The single FIGURE is a partly schematic, sectional, elevated view of a filter apparatus for carrying out the method according to the present invention.

DETAILED DESCRIPTION OF A PREFERRED EMBODIMENT

Figure 1:
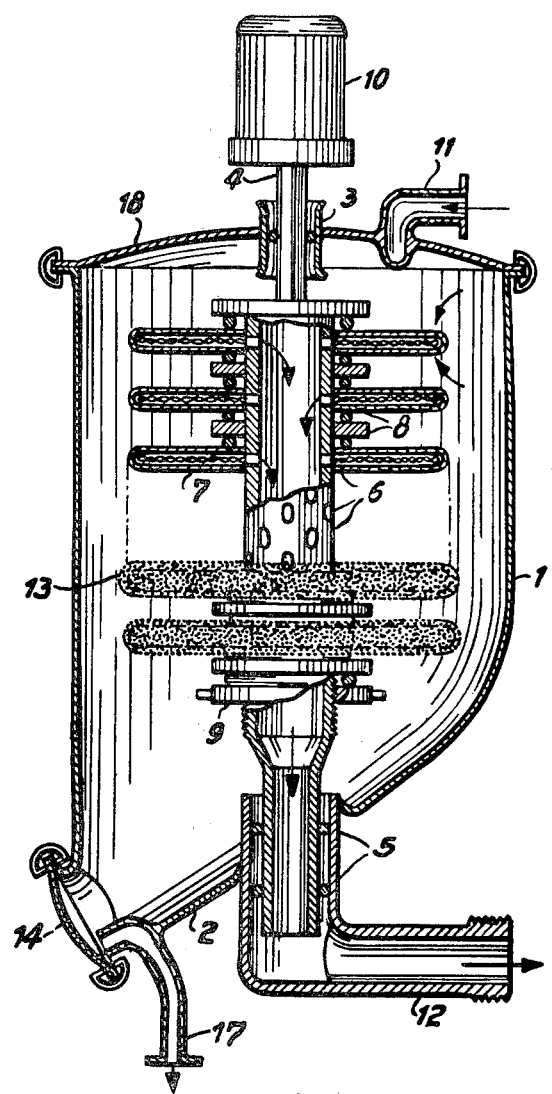

Referring to the single FIGURE in the drawings, it will be seen that the filter apparatus illustrated therein includes a housing 1 which is of substantially cylindrical configuration. The lower portion of this housing is of reduced size and extends to one side of the axis fo the housing to form a discharge passage 2 at the bottom of the housing. A cover 18 closes the top of the housing, and this cover 18 carries a bearing 3 for a drive shaft 4. This drive shaft 4 has an elongated hollow portion which is turnably guided adjacent its bottom end by another bearing 5 located at the lower wall of the housing. The bearings 3 and 5 may take the form of suitable sealing glands, rubber rings, or the like so that the interior of the housing is sealed from the exterior thereof. The hollow portion of the shaft 4 is formed in the wall with suitable cutouts 6. A series of filter elements 7 are carried by the shaft 4 for rotation therewith and cooperate through the cutouts 6 with the interior of the shaft 4. In the illustrated example the filter elements 7 are of a substantially flat disk-shape, but they may have any other suitable form. These filter elements are in the form of hollow disks having walls formed with suitable apertures through which a liquid flows while the particles suspended in the liquid are retained at the exterior of the filter elements. A plurality of sealing rings 8 are located between each pair of successive filter elements 7 so that the hollow shaft 4 can communicate at its interior only with the interior of the filter elements 7. The sealing rings 8 take the form of an annular washer or the like located between a pair of rubber rings which respectively engage a pair of successive filter elements, as shown in the single FIGURE. Thus, the sealing rings 8 not only seal the hollow shaft 4, but in addition they serve to space the filter elements at the desired distance from each other. The bottom end portion of the shaft 4 is threaded portion of the shaft 4 and serves to press all of the filter elements 7 and sealing rings 8 together, the shaft 4 being provided at its upper portion, just beneath the bearing 3, with an outwardly extending annular flange against which the topmost sealing ring bears. A motor 10 or other suitable drive means is operatively connected to the upper end of the drive shaft 4 for rotating the latter in a manner described below.

The liquid which is to be filtered flows into the apparatus through a pipe 11 connected to and passing through the cover 18 and having a bottom open end, this pipe 11 communicating with any suitable conduit which leads from any desired source of the liquid to be filtered. The liquid to be filtered fills the housing 1 and surrounds the filter elements 7. The liquid passes through the filter elements into the interior thereof during the filtering process, and then the liquid flows through the cutouts 6 into the hollow shaft 4 whose bottom open end extends into a discharge tube 12. A suitable pump or the like (not shown) communicates with the interior of the tube 12 to draw the filtered liquid therethrough.

The filter elements 7 may remain stationary during the filtering process, or the shaft 4 may be rotating slowly during the filtering process, and the filtered particles collect at the outer surface of the filter elements 7 to form the cakes 13. When the cakes 13 have attained a predetermined thickness, so that very little or no liquid can flow through the cakes 13 into the filters, then the flow of liquid to be filtered to the pipe 11 is stopped in any suitable way, which may be manual or automatic, and the shaft 4 is rotated at a high speed so that the particles which form the cakes 13 are thrown from the filter elements 7 by centrifugal force. The setting of the shaft 4 into a high speed of rotation may be carried out either by hand or automatically. Where the shaft 4 is set into high speed rotation automatically, the automatic action may be derived from the liquid which flows only slowly through the pipe 12. A closure member 14 is shown adjacent to an emptying tube 17 for draining liquid from the filter.

The following example is presented to further illustrate the invention and is not intended to limit the same in any manner:

EXAMPLE

1. Preparation of the alluvial suspension 4 kg of quartz sand having a particle size of 60–315 microns is suspended in one cubic meter ($m^3$) of a solution containing 10–30% (preferably 15%) by weight of acetic acid esters of cellulose (from which cellulose acetate is later precipitated, generally by the addition of water, frequently in the form of dilute aqueous acetic acid). The solvent containing the acetylated cellulose is dimethylformamide, acetone, ethyl acetate or another suitable organic sovent for cellulose. The suspension is performed by agitating the solution and the quartz sand for 1–2 hours with the help of a stirrer. After this period of time, 0.150–0.600 kg/$m^3$, preferably 0.300 kg/$m^3$ of cellulose fibers, preferably shredded cotton linters, are mixed with the solution. The mixture is further stirred for 1–2 hours. This preparation takes place separately for each filter cycle; however, this preparation of an alluvial suspension can also take place continually.

2. Filtration

For actual filtration, a precoat is first applied upon the filter medium (e.g. the filter elements 7 of the FIGURE). The filter precoat consists of a layer of quartz sand having a particle size of 100–315 microns. A suspension of 2–3 kg of sand per square meter ($m^2$) of filter surface is used for suspension filtration. Additional precoating is not required as a rule. Subsequent to the precoating the previously prepared suspension is then filtered through the filter elements in the usual manner.

On completion of the filtration, the filter clogging value (FZ) was found to be from 20–80 per gram. (A value of 30 per gram is preferred, depending on the acetic acid esters of cellulose which are filtered.) This range of filter clogging values is considerably below the range achieved with the use of only quartz sand as a filter aid. Consequently, the inventive addition of loose particulate matter and loose fibers to the matter to be filtered causes a reduction of clogging relative to the amount of filtrate passing through the pores of a filtering medium and, as a result, increases the effective filtering time of the filtering medium.

The inventively produced alluvial suspension may be produced from all kinds of acetic acid esters of cellulose. For each kind, it is only necessary that an optimum proportion of, for example, quartz sand to cellulose fibers be established.

It will be understood that each of the elements described above, or two or more together, may also find a useful application in other types of in a process for filtering a cellulose acetate solution differing from the types described above.

While the invention has been illustrated and described as embodied in a process, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for filtering a cellulose acetate solution comprising the steps of providing a solution of cellulose acetate in an organic solvent; adding to said solution a mixture of quartz sand in loose particulate form and a loose fiber material; and filtering said mixture through a filter so as to produce a filtrate of said solution, whereby due to the addition of said loose particulate quartz sand and of said loose fibers clogging of the pores of the filter is reduced relative to the amount of filtrate passing through the filter and the effective filtering time of the filter is thereby increased.

2. A process as defined in claim 1, wherein said quartz sand is of a particle size of about 60–320 microns.

3. A process as defined in claim 1, wherein said loose fibers are cellulose fibers.

4. A process as defined in claim 1, further comprising the preliminary step of precoating the filter with a filter aid of quartz sand.

5. A process as defined in claim 4 wherein said filtering aid consists of quartz sand of a particle size of about 100–315 microns.

6. A process as defined in claim 1, wherein said solution is a solution containing 10–30% by weight of an acetic acid ester of cellulose.

7. A process as defind in claim 1 wherein the acetate solution after the quartz sand has been added thereto is subjected to agitation for about 1 to 2 hours prior to adding said loose fibers.

8. A process as defined in claim 7, further comprising the step of stirring said mixture for another 1-2 hours following adding said cellulose fibers.

9. A process as defined in claim 1, wherein said filtering is performed with a rotary disc filter.

* * * * *